United States Patent
Ferguson et al.

(10) Patent No.: US 10,018,716 B2
(45) Date of Patent: Jul. 10, 2018

(54) SYSTEMS AND METHODS FOR CALIBRATION AND OPTIMIZATION OF FREQUENCY MODULATED CONTINUOUS WAVE RADAR ALTIMETERS USING ADJUSTABLE SELF-INTERFERENCE CANCELLATION

(71) Applicant: Honeywell International Inc., Morristown, NJ (US)

(72) Inventors: Paul David Ferguson, Redmond, WA (US); Marc Pos, Duvall, WA (US); Robert Jason Tinsley, Norcross, GA (US)

(73) Assignee: Honeywell International Inc., Morris Plains, NJ (US)

( * ) Notice: Subject to any disclaimer, the term of this patent is extended or adjusted under 35 U.S.C. 154(b) by 313 days.

(21) Appl. No.: 14/316,176

(22) Filed: Jun. 26, 2014

(65) Prior Publication Data

US 2015/0378017 A1 Dec. 31, 2015

(51) Int. Cl.
*G01S 7/34* (2006.01)
*G01S 13/88* (2006.01)
(Continued)

(52) U.S. Cl.
CPC ............ *G01S 13/882* (2013.01); *G01S 7/034* (2013.01); *G01S 7/038* (2013.01); *G01S 7/4008* (2013.01); *G01S 7/4017* (2013.01); *G01S 13/343* (2013.01)

(58) Field of Classification Search
CPC ..... G01S 7/34; G01S 7/36; G01S 7/38; G01S 7/4008; G01S 7/4021
(Continued)

(56) References Cited

U.S. PATENT DOCUMENTS 3,021,521 A * 2/1962 Hutchins ................. G01S 7/038
333/12
3,256,520 A 6/1966 Blitz
(Continued)

FOREIGN PATENT DOCUMENTS

CN 101639533 2/2010
CN 101981467 2/2011
(Continued)

OTHER PUBLICATIONS

European Patent Office, "Office Action from EP Application No. 13176560.4 dated Jan. 26, 2015", "from Foreign counterpart of U.S. Appl. No. 13/559,834", dated Jan. 26, 2015, pp. 1-12, Published in: EP.
(Continued)

*Primary Examiner* — Peter M Bythrow
*Assistant Examiner* — Daniel P Malley, Sr.
(74) *Attorney, Agent, or Firm* — Fogg & Powers LLC (57) ABSTRACT

Systems and methods for calibrating and optimizing frequency modulated continuous wave radar altimeters using adjustable self-interference cancellation are disclosed. In at least one embodiment, a radar altimeter system comprises: a local oscillator delay line including a variable delay circuit configured to output a delayed signal, a transmitter coupled to the local oscillator delay line and configured to output a transmitter signal, a transceiver circulator coupled to an antenna and coupled to the transmitter, and a frequency mixer coupled to the delay line and coupled to the transceiver circulator. The transceiver circulator directs the transmitter signal to the antenna and the antenna is configured to transmit the transmitter signal and receive a reflected signal from a target. Further, the frequency mixer is configured to receive the delayed signal and the target reflected signal from the transceiver circulator.

12 Claims, 4 Drawing Sheets

(51) Int. Cl.
*G01S 7/03* (2006.01)
*G01S 7/40* (2006.01)
*G01S 13/34* (2006.01)

(58) Field of Classification Search
USPC .................................................. 342/120
See application file for complete search history.

(56) References Cited

U.S. PATENT DOCUMENTS

| | | | |
|---|---|---|---|
| 3,611,377 | A | 10/1971 | Rittenbach |
| 3,699,480 | A | 10/1972 | Mueller |
| 3,703,004 | A | 11/1972 | Slater |
| 3,766,554 | A | 10/1973 | Tresselt |
| 3,774,206 | A | 11/1973 | Rauch |
| 4,577,163 | A | 3/1986 | Culp |
| 4,604,591 | A | 8/1986 | Vasile |
| 4,682,175 | A | 7/1987 | Lazarus |
| 4,695,013 | A | 9/1987 | Trampnau |
| 4,701,714 | A * | 10/1987 | Agoston ............... H03H 7/325 327/277 |
| 4,725,842 | A * | 2/1988 | Mayberry ............ G01S 7/038 342/198 |
| 4,728,953 | A | 3/1988 | Richmond |
| 4,825,214 | A * | 4/1989 | Dejaegher ........... G01S 7/038 342/128 |
| 4,945,360 | A | 7/1990 | Trummer et al. |
| 4,965,533 | A | 10/1990 | Gilmore |
| 4,967,201 | A | 10/1990 | Rich, III |
| 4,968,967 | A | 11/1990 | Stove |
| 4,970,519 | A | 11/1990 | Minnis |
| 5,353,038 | A | 10/1994 | Osborne et al. |
| 5,359,331 | A | 10/1994 | Adler |
| 5,361,070 | A * | 11/1994 | McEwan ............. A61B 5/0507 342/21 |
| 5,548,243 | A | 8/1996 | Sun et al. |
| 5,719,581 | A | 2/1998 | Poe |
| 5,757,239 | A | 5/1998 | Gilmore |
| 5,757,311 | A | 5/1998 | Voyce |
| 5,757,312 | A | 5/1998 | Szmurlo et al. |
| 5,969,667 | A | 10/1999 | Farmer et al. |
| 6,043,758 | A | 3/2000 | Snyder, Jr. et al. |
| 6,087,980 | A | 7/2000 | Saryo |
| 6,154,640 | A | 11/2000 | Itoh et al. |
| 6,295,020 | B1 | 9/2001 | Koechlin |
| 6,373,427 | B1 | 4/2002 | Hohne |
| 6,384,770 | B1 | 5/2002 | de Gouy et al. |
| 6,407,697 | B1 | 6/2002 | Hager et al. |
| 6,426,717 | B1 | 7/2002 | Maloratsky |
| 6,486,826 | B1 | 11/2002 | Cramer et al. |
| 6,556,096 | B1 | 4/2003 | Ouacha et al. |
| 7,098,841 | B2 | 8/2006 | Hager et al. |
| 7,161,527 | B2 | 1/2007 | Vacanti |
| 7,239,266 | B2 | 7/2007 | Vacanti |
| 7,295,151 | B2 | 11/2007 | Vacanti |
| 7,463,710 | B2 | 12/2008 | Walsh et al. |
| 7,656,347 | B2 | 2/2010 | Hong et al. |
| 7,791,415 | B2 | 9/2010 | Hombuckle |
| 7,825,851 | B2 | 11/2010 | Vacanti |
| RE42,316 | E | 5/2011 | Vacanti |
| 8,085,097 | B2 | 12/2011 | Cloutier et al. |
| 8,259,002 | B2 | 9/2012 | Vacanti et al. |
| 8,324,515 | B2 | 12/2012 | Stevenson et al. |
| 8,463,201 | B2 | 6/2013 | Jung et al. |
| 8,638,139 | B2 | 1/2014 | Keaveney et al. |
| 8,917,204 | B2 * | 12/2014 | Trotta .................... G01S 7/023 342/159 |
| 2001/0015699 | A1 * | 8/2001 | Chiles ................. G01S 7/03 342/120 |
| 2002/0066829 | A1 | 6/2002 | DeWitt et al. |
| 2002/0112218 | A1 * | 8/2002 | Nakamura .......... G06F 17/5036 716/113 |
| 2002/0135970 | A1 | 9/2002 | Klee et al. |
| 2003/0201930 | A1 | 10/2003 | Nagasaku et al. |
| 2004/0130482 | A1 | 7/2004 | Lin et al. |
| 2004/0135703 | A1 | 7/2004 | Arnold et al. |
| 2005/0225330 | A1 | 10/2005 | Ochiai et al. |
| 2006/0049977 | A1 | 3/2006 | Vacanti |
| 2006/0262475 | A1 * | 11/2006 | Katsumata ............. H01P 1/18 361/113 |
| 2008/0246649 | A1 | 10/2008 | Backes et al. |
| 2009/0315761 | A1 | 12/2009 | Walter et al. |
| 2010/0225524 | A1 | 9/2010 | Szajnowski |
| 2010/0283665 | A1 | 11/2010 | Bashir et al. |
| 2011/0122017 | A1 | 5/2011 | Vacanti |
| 2011/0205105 | A1 | 8/2011 | Reuter |
| 2011/0221628 | A1 | 9/2011 | Kamo et al. |
| 2012/0112806 | A1 | 5/2012 | Dayi |
| 2012/0242383 | A1 | 9/2012 | Elad et al. |
| 2012/0256781 | A1 | 10/2012 | Vacanti et al. |
| 2013/0002329 | A1 * | 1/2013 | Murofushi ............ G01S 7/032 327/231 |
| 2013/0033402 | A1 | 2/2013 | Meyer |
| 2013/0214963 | A1 | 8/2013 | Vacanti |
| 2013/0214964 | A1 | 8/2013 | Holt |
| 2013/0271186 | A1 * | 10/2013 | Hossain ................ H03L 7/235 327/107 |
| 2014/0028491 | A1 | 1/2014 | Ferguson |
| 2014/0070985 | A1 | 3/2014 | Vacanti |
| 2015/0078217 | A1 * | 3/2015 | Choi .................... H04B 1/525 370/278 |
| 2015/0365064 | A1 * | 12/2015 | Tinsley ................. H03H 7/325 333/139 |
| 2016/0139256 | A1 | 6/2016 | Ferguson |

FOREIGN PATENT DOCUMENTS

| | | |
|---|---|---|
| CN | 102313885 | 1/2012 |
| DE | 19855367 | 6/2000 |
| DE | 19915247 | 10/2000 |
| EP | 0138253 A2 | 4/1985 |
| EP | 0138253 A3 | 2/1987 |
| EP | 1227536 | 7/2002 |
| EP | 2690455 | 1/2014 |
| GB | 2007930 | 5/1979 |
| JP | 60008197 | 1/1985 |
| JP | 6120735 | 4/1994 |
| JP | 8097744 | 4/1996 |
| JP | H08125701 | 5/1996 |
| JP | 11148972 | 6/1999 |
| JP | 2000151328 | 5/2000 |
| JP | 2002353709 | 12/2002 |
| JP | 2003018001 | 1/2003 |
| JP | 200527246 | 1/2005 |
| JP | 2005151444 | 6/2005 |
| JP | 2013200135 | 10/2013 |
| TW | 580579 | 3/2004 |
| WO | 9935740 | 7/1999 |
| WO | 2011064157 | 6/2011 |

OTHER PUBLICATIONS

European Patent Office, "European Search Report from EP Application No. 13176560.4 dated Nov. 18, 2014", "from Foreign Counterpart of U.S. Appl. No. 13/559,834", dated Nov. 18, 2014, pp. 1-5, Published in: EP.

U.S. Patent Office, "Office Action", "from U.S. Appl. No. 13/559,834 dated Apr. 23, 2015", dated Apr. 23, 2015, pp. 1-25 .

European Patent Office, "Communication Under Rule 71(3) EPC from EP Application No. 131551160 dated Aug. 6, 2015", "from Foreign Counterpart of U.S. Appl. No. 13/662,755", dated Aug. 6, 2015, pp. 1-30, Published in: EP.

U.S. Patent and Trademark Office, "Final Office Action", "U.S. Appl. No. 13/559,834", dated Jul. 28, 2015, pp. 1-10

U.S. Patent and Trademark Office, "Advisory Action", "U.S. Appl. No. 13/559,834", dated Oct. 16, 2015, pp. 1-4.

European Patent Office, "Extended European Search Report from EP Application No. 15170178.6 dated Nov. 5, 2015", "from Foreign Counterpart of U.S. Appl. No. 14/316,176", dated Nov. 5, 2015, pp. 1-8, Published in: EP.

(56) References Cited

OTHER PUBLICATIONS

U.S. Patent and Trademark Office, "Notice of Allowance and Fee(s) Due", from U.S. Appl. No. 13/559,834, dated Nov. 25, 2015, pp. 1-8, Published in: US.
European Patent Office, "Extended EP Search Report from EP Application No. 15168777.9 dated Nov. 17, 2015", "from Foreign Counterpart of U.S. Appl. No. 14/303,180", dated Nov. 17, 2015, pp. 1-8, Published in: EP.
Thompson, "Intuitive Analog Circuit Design", Dec. 6, 2013, pp. 571-572, Publisher: Newnes, Elsevier, Published in: US.
European Patent Office, "Communication persuant to Article 94(3) EPC from EP application No. 13176560.4", "from foreign counterpart of U.S. Appl. No. 13/559,834", dated Feb. 12, 2016, pp. 1-5, Published in: EP.
U.S. Patent and Trademark Office, "Office Action", "U.S. Appl. No. 15/006,766", dated Apr. 5, 2016, pp. 1-22, Published in: US.
U.S. Patent and Trademark Office, "Office Action", "U.S. Appl. No. 14/303,180", dated Apr. 8, 2016, pp. 1-33.
European Patent Office, "Partial European Search Report", "from Foreign Counterpart of U.S. Appl. No. 13/559,834", dated Jul. 10, 2014, pp. 1-6, Published in: EP.
U.S. Patent and Trademark Office, Restriction Requirement from U.S. Appl. No. 13/559,834, dated Mar. 12, 2015, dated Mar. 12, 2015, pp. 1-5.
State Intellectual Property Office, P.R. China, "Office Action, from CN Application No. 201310476753.5, dated Sep. 18, 2016", "from Foreign Counterpart U.S. Appl. No. 13/559,834", dated Sep. 18, 2016, pp. 1-15.
European Patent Office, "Communication under Rule 71(3) EPC from EP Application No. 13176560.4 dated Sep. 20, 2016", "from Foreign Counterpart of U.S. Appl. No. 13/559,834", dated Sep. 20, 2016, pp. 1-64, Published in: EP.
U.S. Patent and Trademark Office, "Notice of Allowance", "U.S. Appl. No. 15/006,766, filed Jan. 26, 2016", dated Aug. 11, 2016, pp. 1-5, Published in: US.
State Intellectual Property Office, P.R. China, "Chinese Office Action from CN Application No. 201310128132.8, dated Dec. 19, 2016", "from Foreign Counterpart of U.S. Appl. No. 13/662,755", dated Dec. 19, 2016, pp. 1-12, Published in: CN.
European Patent Office, "Extended European Search Report from EP Application No. 16198451.3 dated Mar. 9, 2017", "from Foreign Counterpart of U.S. Appl. No. 13/559,834", dated Mar. 9, 2017, pp. 1-9, Published in: EP.
U.S. Patent and Trademark Office, "Notice of Allowance", "U.S. Appl. No. 14/303,180", dated Jan. 18, 2017, 17 Pages.
State Intellectual Property Office of the People's Republic of China, "Notification of Correction of Notice of Grant of Patent Right for Invention from CN Application No. 201310128132.8, dated Jun. 30, 2017", from Foreign Counterpart of U.S. Appl. No. 13/662,755, dated Jun. 30, 2017, pp. 1-4, Published in: CN.
European Patent Office, "Communication pursuant to Article 94(3) EPC from EP Application No. 1516877.9 dated Jun. 29, 2017", from Foreign Counterpart of U.S. Appl. No. 14/303,180, dated Jun. 29, 2017, pp. 1-4.
State Intellectual Property Office, P.R. China, "Notification to Grant Patent Right for Invention from CN Application No. 201310128132.8 dated Jun. 2, 2017", "from Foreign Counterpart of U.S. Appl. No. 13/662,755", dated Jun. 2, 2017, pp. 1-5.
State Intellectual Properoty Office, P.R. China, "Office Action from CN Application No. 201310476753.5, dated Apr. 19, 2017", "from Foreign Counterpart of U.S. Appl. No. 13/559,834", dated Apr. 19, 2017, pp. 1-8.
Japan Patent Office, "Notification of Reasons For Rejection from JP Application No. 2007-530115 dated Apr. 25, 2011", "from Foreign Counterpart of U.S. Appl. No. 10/926,676", dated Apr. 25, 2011, pp. 1-8, Published in: JP.
Japan Patent Office, "Notice of Reason For Rejection from JP Application No. 2007-530115 dated Jul. 9, 2012", "from Foreign Counterpart of U.S. Appl. No. 10/926,676", dated Jul. 9, 2012, pp. 1-6, Published in: JP.

Japanese Patent Office, "Office Action from JP Application No. 2012-244383 dated Aug. 2, 2013", "from Foreign Counterpart of U.S. Appl. No. 10/926,676", dated Aug. 2, 2013, pp. 1-9, Published in: JP.
U.S. Patent and Trademark Office, "Notice of Allowance", "U.S. Appl. No. 10/926,676", dated Mar. 14, 2007, pp. 1-6, Published in: US.
U.S. Patent and Trademark Office, "Office Action", "U.S. Appl. No. 10/926,676", dated Apr. 17, 2006, pp. 1-10, Published in: US.
U.S. Patent and Trademark Office, "Final Office Action", "U.S. Appl. No. 10/926,676", dated Sep. 8, 2006, pp. 1-9, Published in: US.
European Patent Office, "European Search Report from EP Application No. 13155116.0 dated Jun. 7, 2013", "from Foreign Counterpart of U.S. Appl. No. 13/662,755", dated Jun. 7, 2013, pp. 1-3, Published in: EP.
U.S. Patent and Trademark Office, "Notice of Allowance ", dated Jun. 27, 2014, pp. 1-31, U.S. Appl. No. 13/662,755, Published in: US.
European Patent Office, "Office Action from EP Application No. 13154997.4 dated Jun. 19, 2013", "from Foreign Counterpart of U.S. Appl. No. 13/760,347", dated Jun. 19, 2013, pp. 1-6, Published in: EP.
European Patent Office, "European Search Report from EP Application No. 13154997.4 dated Jun. 6, 2013", "from Foreign Counterpart of U.S. Appl. No. 13/760,347", dated Jun. 6, 2013, pp. 1-3. Published in: EP.
Appel, "Fractional N Synthesizers", "RF Signal Processing", Nov. 2000, pp. 1-9.
Belfiori, "Antenna Array Signal Processing for Multistatic Radar Systems", Jun. 12, 2013, pp. i-146, Published in: IT.
Benard, "A High-Stability Low-Offset Phase-Locked-Loop Frequency Synthesizer", "IEEE Transactions on Instrumentation and Measurement", Sep. 1975, pp. 222-224, vol. IM-24, No. 3.
"KRA 10A Radar Altimeter", May 2000, pp. 1-4, Publisher: Allied Signal Aerospace.
Bisanti et al., "Fully integrated Sigma-Delta Synthesizer Suitable for 'Indirect VCO modulation' in 2.5G application", "2003 IEEE Radio Frequency Integrated Circuits Symposium", at least as early as Dec. 2003, pp. 515-518.
"TRA-3000 and TRA-3500 Radar Altimeters", Feb. 2009, pp. 1-2, Publisher: Free Flight Systems.
Caglio et al., "An Integrated GaAs 1.25 GHz Clock Frequency FM-CW Direct Digital Synthesizer", Oct. 1993, pp. 167-170.
Gupta, "Optimization and Realization of tunable Band pass Filters", "retrieved on Feb. 20, 2014 from Internet http://www.linkedin.com/pub/navam-gupta/4a/862/248", May 2011-Jul. 2011, pp. 1-3.
"Honeywell HG8500 Series Radar Altimeter", Jul. 2003, pp. 1-2, Publisher: Honeywell International Inc.
Jeong et al., "A Multi-Beam and Multi-Range Radar with FMCW and Digital Beam Forming for Automotive Applications", "Progress in Electromagnetics Research", Nov. 2011, pp. 285-299, vol. 124.
Nash, "Phase-Locked Loop Design Fundamentals", Feb. 2006, pp. 1-22, Publisher: Freescale Semiconductor.
Pavlenko, "Tunable lumped-element bandpass filters for Cognitive Radio application", "Master's Degree Programme in Technomathematics and Technical Physics", May 2013, pp. i-49.
Pazarci, "Phase-Lock Systems (ELE608E-01)", Jan. 27, 2009, pp. 1-2.
Reynolds et al., "Single chip FMCW radar for target velocity and range sensing applications", "Gallium Arsenide Integrated Circuit (GaAs IC) Symposium, 1989. Technical Digest 1989., 11th Annual", Oct. 1989, pp. 243-246.
"Miniature Radar Altimeter: MRA Type 1", May 2012, pp. 1-2, Publisher: Roke Manor Research Limited.
"Miniature Radar Altimeter: MRA Type 2", May 2012, pp. 1-2, Publisher: Roke Manor Research Limited.
Saul, "Direct Frequency Synthesis: A Review of the Technique and Potential", Jul. 1990, pp. 5-9, Publisher: Plessey Research Caswell, U.K.
"Micro Radar Altimeter: UMRR-0A", Dec. 2011, pp. 1-2, Publisher: S.M.S. Smart Microwave Sensors GmbH.

(56) References Cited

OTHER PUBLICATIONS

"Radar Altimeter System Comparison", Dec. 2011, p. 1, Publisher: Southeast Aerospace.
"Fractional/Integer-N PLL Basics", Aug. 1999, pp. 1-55, Publisher: Texas Instruments.
Tinsley et al., "Variable Delay Line Using Variable Capacitors in a Maximally Flat Time Delay Filter", "U.S. Appl. No. 14/303,180, filed Jun. 12, 2014", Jun. 12, 2014, pp. 1-21, Published in: US.

* cited by examiner

FIG. 2

SYSTEMS AND METHODS FOR CALIBRATION AND OPTIMIZATION OF FREQUENCY MODULATED CONTINUOUS WAVE RADAR ALTIMETERS USING ADJUSTABLE SELF-INTERFERENCE CANCELLATION

CROSS-REFERENCE TO RELATED APPLICATIONS

This Application is related to U.S. patent application Ser. No. 13/662,755 entitled, "HIGH SENSITIVITY SINGLE ANTENNA FMCW RADAR", and U.S. patent application Ser. No. 13/559,834 entitled, "METHOD OF SYSTEM COMPENSATION TO REDUCE THE EFFECTS OF SELF INTERFERENCE IN FREQUENCY MODULATED CONTINUOUS WAVE ALTIMETER SYSTEMS", both of which are incorporated herein by reference in their entirety.

BACKGROUND

In frequency modulated continuous wave (FMCW) radar, commonly used in radar altimeters, there is an inherent performance degradation and limitation due to self-interference. Self-interference occurs due to leakage of the transmit signal into the sensitive receive path due to internal and external coupling as well as reflections from the antenna. Self-interference (commonly referred to as self-jam) reduces receiver sensitivity, creates false targets, and limits short range performance.

SUMMARY

Systems and methods for calibrating and optimizing frequency modulated continuous wave radar altimeters using adjustable self-interference cancellation are disclosed. In at least one embodiment, a radar altimeter system comprises: a local oscillator delay line including a variable delay circuit configured to output a delayed signal, a transmitter coupled to the local oscillator delay line and configured to output a transmitter signal, a transceiver circulator coupled to an antenna and coupled to the transmitter, and a frequency mixer coupled to the delay line and coupled to the transceiver circulator. The transceiver circulator directs the transmitter signal to the antenna and the antenna is configured to transmit the transmitter signal and receive a reflected signal from a target. Further, the frequency mixer is configured to receive the delayed signal and the target reflected signal from the transceiver circulator.

DRAWINGS

Understanding that the drawings depict only exemplary embodiments and are not therefore to be considered limiting in scope, the exemplary embodiments will be described with additional specificity and detail through the use of the accompanying drawings, in which.

Like reference numbers and designations in the various drawings indicate like elements.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In conventional implementations, separate transmit and receive antennas (bistatic radar) have been used to address many of the coupling and reflection problems discussed above. In systems that use a single antenna (monostatic radar) to transmit and receive signals, the approximate time delay matching of the local oscillator (LO) signal path has been used to address the loss of receiver sensitivity due to the transmitter phase noise raising the noise floor of the receiver. Recent improvements in system modeling and explicit control of leakage signals both in amplitude and group delay disclosed in U.S. patent application Ser. No. 13/559,834, and incorporated herein by reference, have shown that a monostatic FMCW radar can be designed to have near optimal performance along with range capability down to nearly zero range. The techniques discussed in U.S. patent application Ser. No. 13/559,834 have been successfully proven on the Single Antenna Radar Altimeter (SARA) prototypes built and tested in 2013. However, the compensation technique requires delay lines that are well matched to the characteristics of each individual radar system. Variations in the manufactured systems require each system to have a slightly different compensation delay. In conventional implementations, the different compensation delays that the systems require were solved by varying the physical lengths of transmission lines in the LO paths. Tests show that the physical lengths of the LO transmission lines have to be manually trimmed to the optimal value for the particular system with a tolerance of +/−0.005" or about +/−0.57 ps group delay. Total overall variation in LO transmission line length (also referred to herein as "delay line") for 10 prototype units was approximately 0.050".

The embodiments in this disclosure solve the problem of having to manually adjust each delay line by incorporating a variable delay circuit into the LO delay line of a radar altimeter system. More specifically, by placing a variable delay circuit into the LO delay line of a radar altimeter system, a single LO delay line length can be used for all systems because the delay of the LO delay line can be varied using the variable delay circuit; and, as a result, the small variations between radar altimeters can be compensated for. Further, by having this variability incorporated into the radar altimeter system, the system is capable of periodically readjusting its delay for system changes due to temperature, humidity, aging, or other environmental factors.

Figure 1A:
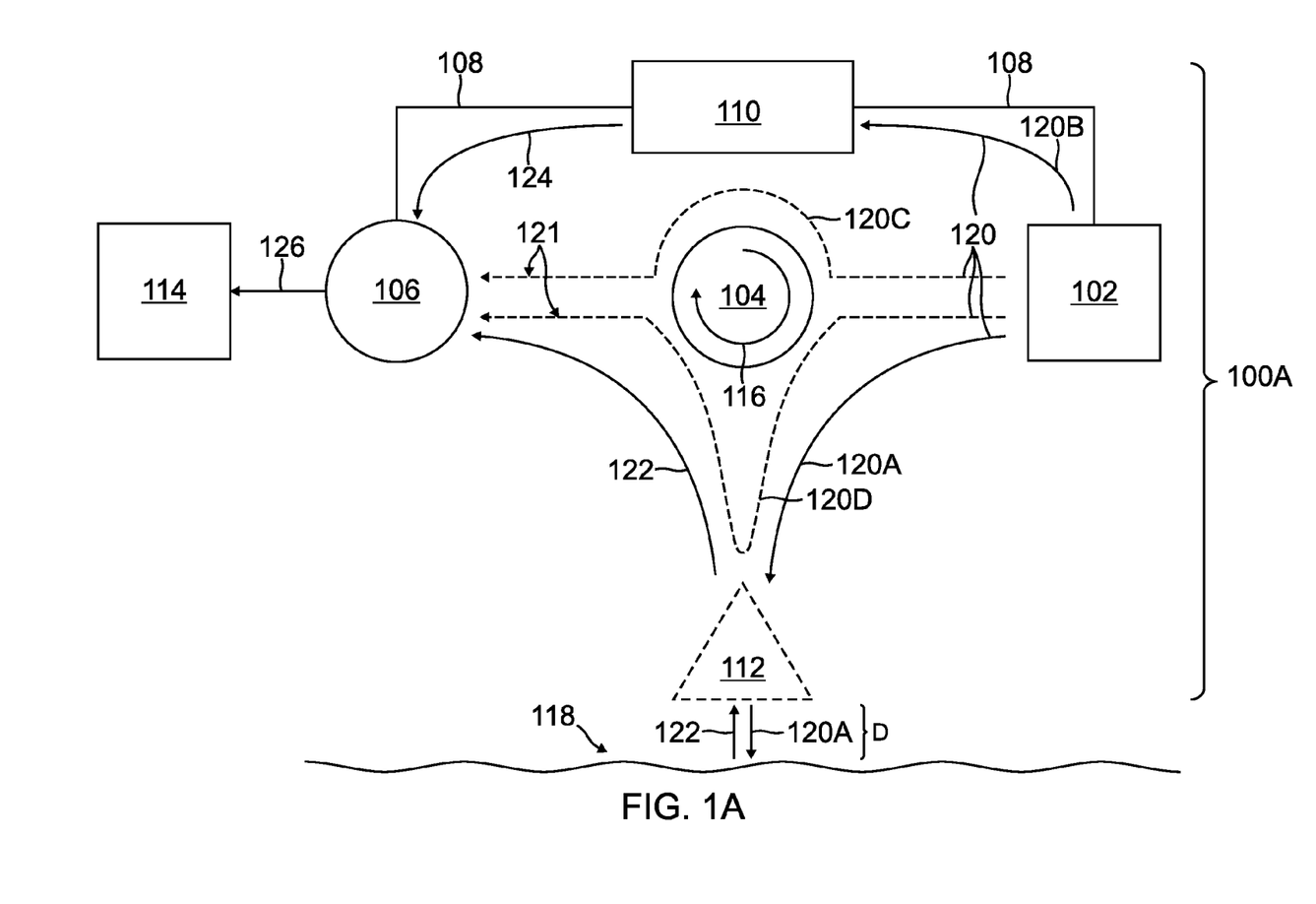
FIGS. 1A-1C are block diagrams of examples of altimeter systems that include variable time delay circuits.

FIG. 1A is a block diagram of an example of a radar altimeter system 100A. The altimeter system 100A includes a transmitter 102, a transceiver circulator 104, a frequency mixer 106, a LO delay line 108 that includes a variable delay circuit 110, an optional antenna 112 and an optional receiver baseband module 114.

The altimeter system 100A works as follows. A linear frequency modulated sweep transmitter signal 120 is generated by the transmitter 102. The frequency modulated transmitter signal 120 will also be referred to herein as transmitter signal 120A-120D to describe the different paths of the frequency modulated transmitter signal 120. The transmitter signal 120A is directed at the antenna 112 by the directionality 116 of the transceiver circulator 104. The transmitter signal 120A propagates to the antenna 112, where the antenna 112 emits the transmitter signal 120A. Once the transmitter signal 120A reaches a target 118, at least a portion of the transmitter signal 120A is reflected by the target 118 as a target reflected signal 122. The target reflected signal 122 is received by the antenna 112 and propagates back through the transceiver circulator 104 to the frequency mixer 106.

A portion of the transmitter signal 120B also transmits through the LO delay line 108. The LO delay line 108 along with the variable delay circuit 110 imparts a time delay to the transmitter signal 120B and outputs a delayed signal 124 to the frequency mixer 106. The frequency mixer 106 receives the target reflected signal 122 and the delayed signal 124 and combines the two signals 122, 124 to yield a frequency difference output 126. The frequency difference output 126 of the frequency mixer 106 equals the frequency sweep of the transmitter signal 120A that has occurred during the time the transmitter signal 120A and the target reflected signal 122 took to travel from the transmitter 102 to the target 118 and back to the frequency mixer 106 minus the time the transmitter signal 120B and the delayed signal 124 took to travel from the transmitter 102 to the frequency mixer 106 via the LO delay line 108 and variable delay circuit 110. The frequency difference output 126 is proportional to the distance D between the antenna 112 and the target 118. As a result, once the receiver baseband module 114 receives the frequency difference output 126, the receiver baseband module 114 can process the frequency difference output 126 and calculate the distance D.

In monostatic systems, such as altimeter system 100A, there are two sources of transmitter signal leakage that can degrade the accuracy of the altimeter system 100A. First, the transceiver circulator 104 leaks some of the transmitter signal 120C opposite the directionality 116 of the transceiver circulator 104 into frequency mixer 106. The portion of the transmitter signal 120C that gets leaked opposite the directionality 116 of the transceiver circulator 104 into the frequency mixer 106 will also be referred to herein as the circulator-leaked signal 120C. Second, a portion of the transmitter signal 120D is reflected by the antenna 112 back into transceiver circulator 104 and into the frequency mixer 106. The portion of the transmitter signal 120D that gets reflected by the antenna 112 back into the transceiver circulator 104 and into the frequency mixer 106 will be referred to herein as the antenna-reflection-leaked signal 120D. These leakage signals 120C, 120D can produce baseband signal outputs from the frequency mixer 106 which can interfere with the measurement of the target reflected signal 122. The combined-leakage signal 121 is a coherent superposition of the leaked signals 120C, 120D and is canceled when mixed with the delayed signal 124 in the frequency mixer 106, as explained below.

As stated above, the frequency mixer 106 receives the target reflected signal 122, the combined-leakage signal 121 and the delayed signal 124. However, in order to obtain accurate ultra-short range (1-4 feet) performance, the frequency difference output 126 must have little or no alternating current (AC) content, due to combined-leakage signal 121, which could interfere with the very low frequency baseband signals produced by an ultra-short range target reflection 122. Embodiments of altimeter system 100A compensate for the self-interference due to the combined-leakage signal 121 Specifically, the phase of the delayed signal 124 maintains a quadrature phase relationship (i.e., 90° or 270°) with the phase of the combined-leakage signal 121 by setting the phase delay in the LO delay line 108 and the variable delay circuit 110. By maintaining a quadrature phase relationship between the delayed signal 124 and the combined-leakage signal 121, the energy in the combined-leakage signal 121 is converted to a zero volt baseband signal by the phase detector properties of the frequency mixer 120. As a result, altimeter system 100A is able to determine an ultra-short distance to a target 118 that is less than 4 feet from the altimeter system 100A.

To vary the delay in the LO delay line 108 so that the energy in the combined-leakage signal 121 is converted to a zero volt baseband signal, the length of the LO delay line 108 can be manufactured so that the delayed signal 124 in the altimeter system 100A maintains a quadrature phase relationship with the phase of the combined-leakage signal 121. The LO delay line 108 can be implemented in any of several transmission line media including, but not limited to, microstrip, coaxial cable, stripline, and coplanar waveguide.

As mentioned above, however, there may be slight manufacturing differences between altimeter systems 100A, which can lead to phase relationships between the delayed signal 124 and the combined-leakage signal 121 that are not exactly 90° or 270° if the same LO delay line length is chosen for each LO delay line 108. In these embodiments, the variable delay circuit 110 can be adjusted to further change the delay in the LO delay line 108. Different examples of variable delay circuits 110 include, but are not limited to, switched line techniques and continuously variable delay filter structures. The variable delay circuit 110 can also be implemented using any of the same media as the fixed LO delay line 108 including, but not limited to, microstrip, coaxial cable, stripline, and coplanar waveguide.

In some embodiments, the variable delay circuit 110 can be adjusted while observing (visually on an oscilloscope or automatically with a digital system) the output of the receiver baseband module 114 with no target reflected signal 122 applied. The variable delay circuit 110 can be adjusted to the tuning point that results in the minimum peak-to-peak voltage at the receiver baseband module 114 output. This tuning point can then be locked in to retain optimal performance. Additionally, the radar system 100A can periodically monitor the receiver baseband module 114 output and compare the result with the known optimal performance. If changes have occurred due to temperature, aging, or other factors, the tuning point can be automatically adjusted until a new optimal performance setting is found. This automatic tuning can occur when the system 100A has knowledge that no targets are within a minimum range guaranteeing that any target signal can be effectively discriminated from the self-interference leakage signal 121. In the case of the system 100A being a radar altimeter, such knowledge can be derived from the historical altitude tracking data. Tuning that does not result in the receiver baseband module 114 output level within predetermined limits will be ignored and the system 100A will default to a previously known tuning point.

Figure 1B:
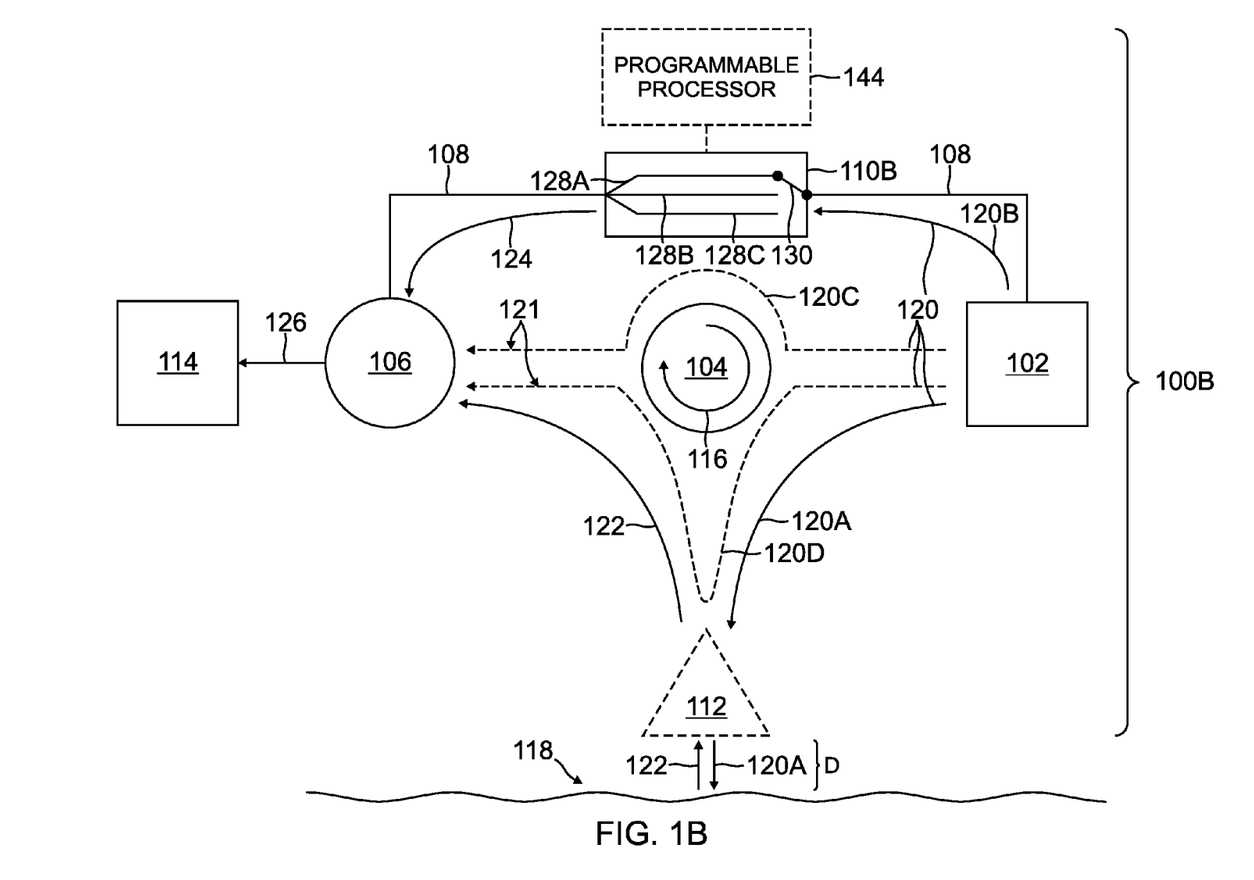

FIG. 1B is a block diagram of an example altimeter system 100B that includes a switchable delay line 110B as the variable delay circuit 110. The switchable delay line 110B includes at least one individual delay line 128A-128C, such that each of the at least one delay lines 128A-128C delays the signal 120B by a different amount due to the different lengths of the delay line lines 128A-128C. Further, the switchable delay line 110B includes a switch 130 that can switch between the different delay lines 128A-128C in order to change the time delay of the transmitter signal 120B. The individual delay lines 128A-128C can be chosen according to the delay required to obtain a quadrature phase relationship between delayed signal 124 and the combined-leakage signal 121. While only three delay lines 128A-128C are shown in FIG. 1B, there may be any number of delay lines included in the switchable delay line 110B. Further, in some embodiments, the switch 130 can be controlled by a programmable processor 144. Programmable processor 144 can be a microcontroller, a microprocessor (e.g., a digital signal processor (DSP)), a field programmable gate array (FPGA), an application specific integrated circuit (ASIC), a central processing unit (CPU) coupled to a memory device or other programmable device.

Figure 1C:
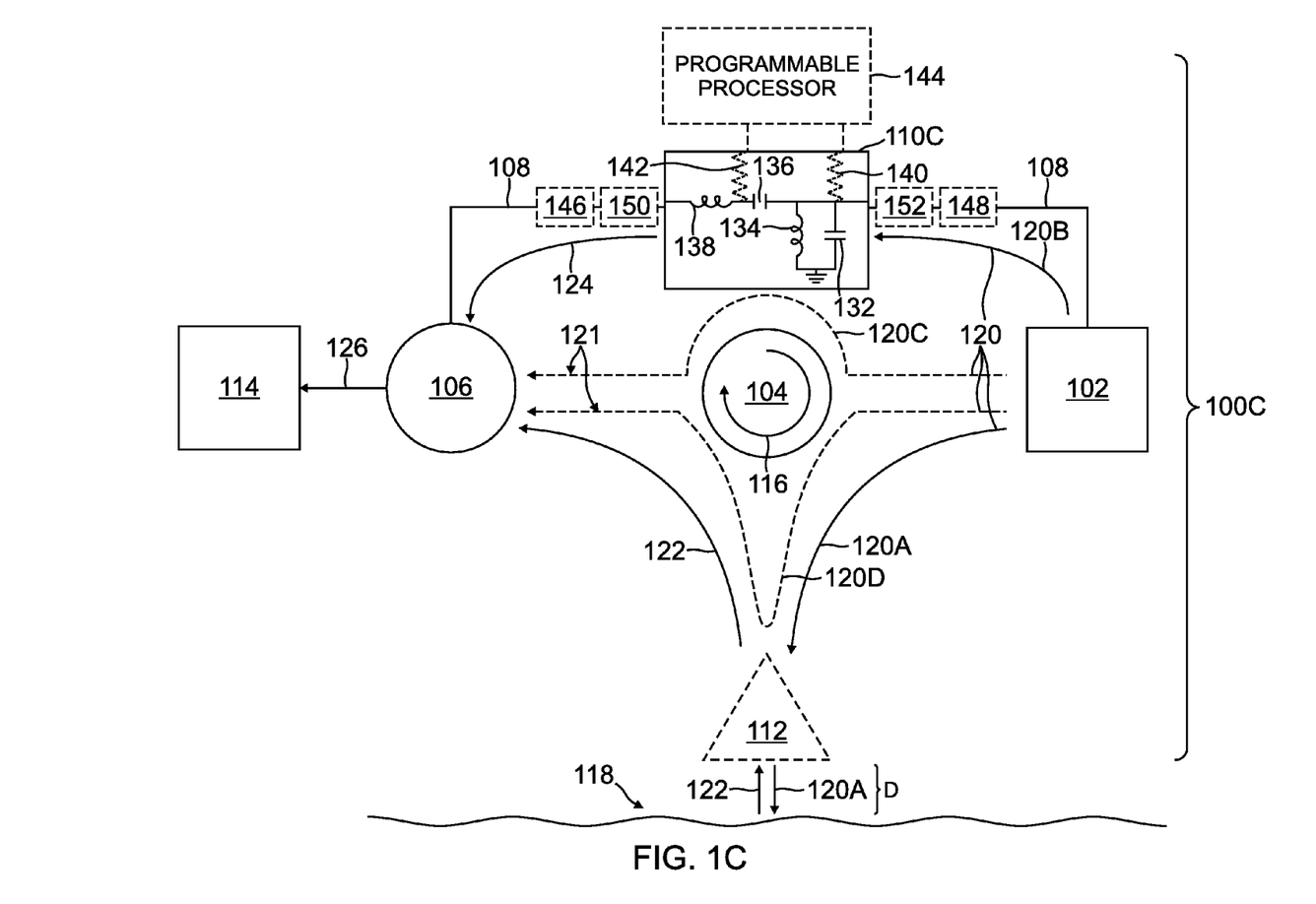

FIG. 1C is a block diagram of an example altimeter system 100C that includes a variable filter 110C as the variable delay circuit 110. The term "variable filter" and "filter" will be used interchangeably throughout this disclosure. The filter 110C can be any type of filter including a bandpass filter, an all-pass filter, a low-pass filter or a high-pass filter. The filter 110C includes at least one first variable capacitor 132. Further, in some embodiments, the filter 110C can also include at least one second variable capacitor 136. For example, in some embodiments, the first variable capacitor 132 can be a variable shunt capacitor 132 and the second variable capacitor 136 can be a variable series capacitor 136. In other embodiments, the first variable capacitor 132 can be a variable series capacitor and the second variable capacitor 136 can be a variable shunt capacitor. In some embodiments, the filter 110C can include at least one first inductor 134, 138. Further, in some embodiments, the filter 110C can also include a second inductor 134, 138. In exemplary embodiments, the filter 110C is a second-order bandpass filter comprising a variable shunt capacitor 132, a shunt inductor 134, a variable series capacitor 136 and a series inductor 138, as shown in FIG. 1C. In other embodiments, other quantities of inductors and capacitors can be included. The at least one first inductor 134, 138 and the at least one second inductor 134, 138 can have fixed values and be implemented in any transmission line media, such as microstrip, or by discrete components.

To adjust the delay applied to an electromagnetic signal travelling through the filter 110C, and therefore the delay in the LO delay line 108, the capacitance of the at least one first variable capacitor 132 can be varied. More specifically, the capacitance of the first variable capacitor 132 is adjusted to achieve the desired delay of the electromagnetic signal travelling in the LO delay line 108. In exemplary embodiments, the first variable capacitor 132 is a variable shunt capacitor 132. In other embodiments, the first variable capacitor 132 is a variable series capacitor.

In exemplary embodiments, the first variable capacitor 132 used to adjust the delay for a signal travelling through the filter 108C can be an electronically variable capacitor 132. If the first variable capacitor 132 is an electronically variable capacitor 132, then the electronically variable capacitor 132 can be in the form of a varicap diode, a varactor diode, a variable capacitance diode, a variable reactance diode, a tuning diode, a digitally tuned capacitor, etc. In embodiments where the first variable capacitor 132 is a varactor diode, the capacitance of the varactor diode is varied in accordance with the magnitude of a reverse-bias voltage 140, 142 applied across the terminals of the varactor diode, wherein the reverse-bias voltage 140, 142 can be controlled by a programmable processor 144. Programmable processor 144 can be a microcontroller, a microprocessor (e.g., a digital signal processor (DSP)), a field programmable gate array (FPGA), an application specific integrated circuit (ASIC), a central processing unit (CPU) coupled to a memory device or other programmable device. In addition, in some embodiments, a digital-to-analog converter can be included with the programmable processor 144 to change the digital output into an analog output for use in controlling the reverse-bias voltage 140, 142. When the capacitance in the electronically variable capacitor 132, 136 is changed due to a change in the reverse-bias voltage 140, 142, the time delay of a signal travelling through the filter 108C, and therefore through the LO delay line 108, changes. In some embodiments, the first variable capacitor 132 can be a mechanically variable capacitor 132.

When the capacitance of the first variable capacitor 132 is adjusted to increase (or decrease) the delay for a signal travelling through the filter 108C, the slope of the delay as a function of frequency changes. Stated another way, there is more (or less) peak-to-peak delay variation for signals with different frequencies in the passband of the filter 108C when the delay is increased (or decreased). To maintain the quadrature phase relationship between the combined-leakage signal 121 and the delayed signal 124, the delayed signal 124 must have the same delay response as the combined leakage signal 121 over the different frequencies in the frequency bandwidth of the transmitter 102. As a result, in some embodiments, the filter 108C can also be used to decrease (or increase) the peak-to-peak delay variation for signals with different frequencies in the passband of the filter 108C. Specifically, in exemplary embodiments, the filter 108C includes at least one second variable capacitor 136, such that the capacitance of the second variable capacitor 136 is configured to adjust the peak-to-peak delay variation for electromagnetic signals with different frequencies in a passband of the filter 108C when varied. In some embodiments, the filter 108C can also include at least one second inductor 134, 138. In exemplary embodiments, the at least one first variable capacitor 132 used to increase (or decrease) the delay for a signal travelling through the filter 108C is a variable shunt capacitor 132; and, the second variable capacitor 136 used to adjust the peak-to-peak delay variation for signals with different frequencies is a variable series capacitor 136. In exemplary embodiments, the capacitance of the second variable series capacitor 136 can be adjusted to decrease the peak-to-peak delay variation to less than two picoseconds.

Similar to above, the second variable capacitor 136 used to adjust the peak-to-peak variation for signals with different frequencies can be an electronically variable capacitor 136; and in other embodiments, the second variable capacitor 136 can be a mechanically variable capacitor 136. When the second variable capacitor 136 is an electronically variable capacitor 136, then the electronically variable capacitor 136 can be in the form of a varicap diode, a varactor diode, a variable capacitance diode, a variable reactance diode, a tuning diode, a digitally tuned capacitor, etc. In embodiments where the second variable capacitor 136 is a varactor diode, the capacitance of the varactor diode is varied in accordance with the magnitude of a reverse-bias voltage 140, 142 applied across the terminals of the varactor diode. In exemplary embodiments, the reverse-bias voltage 140, 142 can be controlled by a programmable processor 144, such as a microcontroller, a microprocessor (e.g., a digital signal processor (DSP)), a field programmable gate array (FPGA), an application specific integrated circuit (ASIC), a central processing unit (CPU) coupled to a memory device or other programmable device. Similar to above, in some embodiments, a digital-to-analog converter can be included with the programmable processor 144 to change the digital output into an analog output for use in controlling the reverse-bias voltage 140, 142.

In some embodiments, tuning the variable shunt capacitor 132 and tuning the variable series capacitor 136 can be an iterative process, i.e., retuning a capacitance that has already been tuned in order to achieve the desired delay and the desired peak-to-peak variation. For example, in some embodiments, after the variable series capacitor 136 is tuned to adjust the peak-to-peak delay variation for signals with different frequencies, the variable shunt capacitor 132 is retuned to achieve the desired delay. In some embodiments, this can be helpful since tuning the variable series capacitor 136, to adjust the peak-to-peak delay variation for signals with different frequencies, may change the delay in the LO delay line 108. After the variable shunt capacitor 132 is retuned, it may be necessary to retune the variable series capacitor 136 to achieve the desired peak-to-peak delay variation. This process can be repeated as many times as necessary to achieve the desired delay in the LO delay line 108 and peak-to-peak variation across the passband of the filter 110C. In some other embodiments, tuning the variable shunt capacitor 132 and tuning the variable series capacitor 136 can be performed at the same time, without iteration, i.e., not retuning a capacitance, to achieve the desired delay and delay variation.

In some embodiments, LO delay line 108 can include optional attenuators 146, 148. Optional attenuator 146 and optional attenuator 148 can reduce the input power and improve overall LO delay line 108 return loss to allow for return loss degradation of the filter 110C due to changing capacitances.

In some embodiments, LO delay line 108 can include optional DC blocking capacitors 150, 152. Optional DC blocking capacitors 150, 152 can be useful if electronically variable capacitors are used as the variable shunt capacitor 132 and the variable series capacitor 136. In embodiments where optional attenuators 146, 148 are included in LO delay line 108, the optional DC blocking capacitors 150 and 152 can be inserted between the filter 110C and optional attenuators 146, 148, respectively. When optional DC blocking capacitors 150, 152 are inserted into LO delay line 108, each optional DC blocking capacitor 150, 152 can help block DC signals, such as the one used to bias the electronically variable capacitors 132, 136, from going beyond the filter 110C and into the LO delay line 108.

Figure 2:
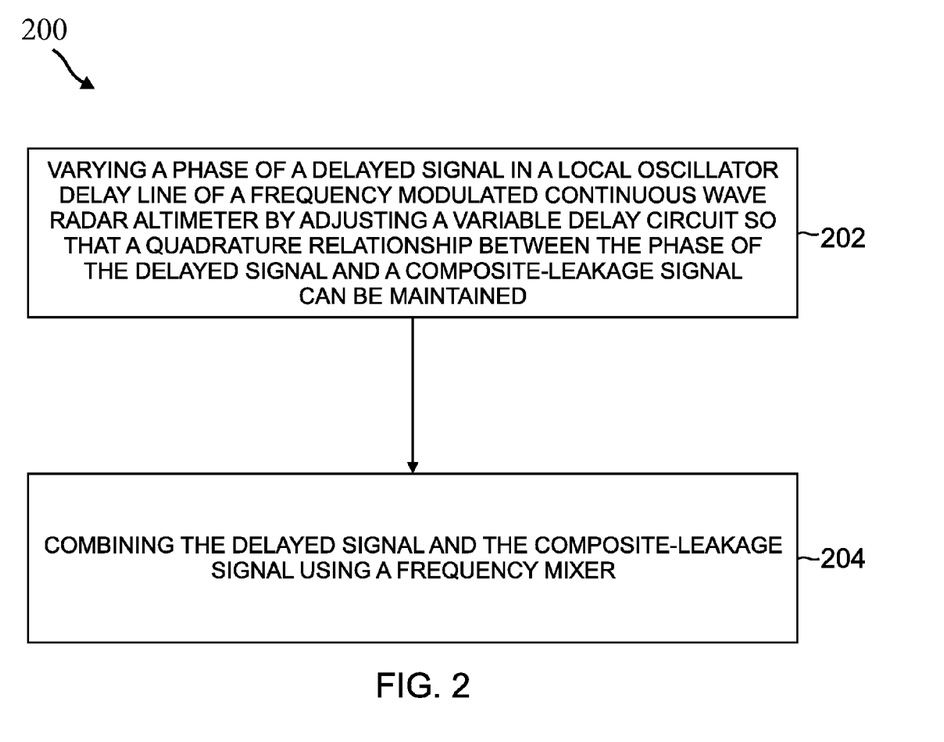
FIG. 2 is a flow diagram of a method for calibrating a frequency modulated continuous wave radar altimeter.

FIG. 2 is a flow diagram of an exemplary method 200 for varying the delay of an electromagnetic signal travelling through a delay line. The method 200 comprises varying a phase of a delayed signal in a local oscillator delay line of a frequency modulated continuous wave (FMCW) radar altimeter by adjusting a variable delay circuit so that a quadrature relationship between the phase of the delayed signal and a composite-leakage signal can be maintained (block 202). In exemplary embodiments, the composite-leakage signal can be comprised of a circulator-leakage signal and an antenna-reflection-leakage signal.

Method 200 further comprises combining the delayed signal and the composite-leakage signal using a frequency mixer (block 204). By combining the delayed signal and the composite-leakage signal using a frequency mixer, small distances can be determined by the FMCW radar altimeter, as discussed above. In some embodiments, the frequency mixer can have some or all of the same characteristics as the frequency mixer 106 discussed above.

In exemplary embodiments, the FMCW radar altimeter can be comprised of a local oscillator (LO) delay line that includes the variable delay circuit, a transmitter coupled to the local oscillator delay line, a transceiver circulator coupled to an antenna and coupled to the transmitter, and a frequency mixer coupled to the delay line and coupled to the transceiver circulator. Further, similar to above, the FMCW radar altimeter can further comprise a receiver baseband module coupled to the frequency mixer. In some embodiments, the LO delay line, the variable delay circuit, the transmitter, the transceiver circulator, the frequency mixer and the receiver baseband module can have some or all of the same characteristics as the LO delay line 108, the variable delay circuit 110, the transmitter 102, the transceiver circulator 104, the frequency mixer 106 and the receiver baseband module 114 in FIGS. 1A-1C above, respectively.

Specifically, in some embodiments, the variable delay circuit can be a switched-line delay network. And in some other embodiments, the variable delay circuit can be a filter. In some embodiments, the switched-line delay network and the filter can have some or all of the same characteristics as the switched-line delay network 110B and the filter 110C in FIGS. 1A-1C above. For example, the filter 110C can include a first variable capacitor and a second variable capacitor, wherein adjusting the variable delay circuit to maintain a quadrature relationship between the phase of the delayed signal and a composite-leakage signal comprises: varying the capacitance of the first variable capacitor to adjust the delay applied to an electromagnetic signal travelling through the filter and varying the capacitance of the second variable capacitor to adjust the peak-to-peak delay variation for electromagnetic signals with different frequencies in a passband of the filter. In exemplary embodiments, the filter is a second-order bandpass filter comprising one variable shunt capacitor, one shunt inductor, one variable series capacitor and one series inductor. Moreover, in some embodiments, the variable shunt capacitor and the variable series capacitor can be electronically variable capacitors and have the properties discussed above in regards to the electronically variable capacitors. In other embodiments, the capacitors can be mechanically variable capacitors. Further, in other embodiments, the filter may comprise more or less capacitors and inductors.

EXAMPLE EMBODIMENTS

Example 1 includes a radar altimeter system comprising: a local oscillator delay line including a variable delay circuit configured to output a delayed signal; a transmitter coupled to the local oscillator delay line and configured to output a transmitter signal; a transceiver circulator coupled to an antenna and coupled to the transmitter, wherein the transceiver circulator directs the transmitter signal to the antenna, and wherein the antenna is configured to transmit the transmitter signal and receive a reflected signal from a target; and a frequency mixer coupled to the delay line and coupled to the transceiver circulator, wherein the frequency mixer is configured to receive the delayed signal and the target reflected signal from the transceiver circulator.

Example 2 includes the radar altimeter system of Example 1, wherein a phase of the delayed signal at the frequency mixer maintains a quadrature relationship to a phase of a composite-leakage signal.

Example 3 includes the radar altimeter system of any of Examples 1-2, wherein the composite-leakage signal comprises a circulator-leakage signal and an antenna-reflection-leakage signal.

Example 4 includes the radar altimeter system of any of Examples 1-3, further comprising the antenna configured to transmit the transmitter signal and receive a reflected signal from a target.

Example 5 includes the radar altimeter system of any of Examples 1-4, further comprising a receiver baseband module coupled to the frequency mixer.

Example 6 includes the radar altimeter system of any of Examples 1-5, wherein the variable delay circuit is a switched-line delay network.

Example 7 includes the radar altimeter system of any of Examples 1-5, wherein the variable delay circuit is a filter.

Example 8 includes the radar altimeter system of Example 7, wherein the filter includes a first variable capacitor, wherein a capacitance of the first variable capacitor is configured to adjust the delay applied to an electromagnetic signal travelling through the filter when varied.

Example 9 includes the radar altimeter system of Example 8, wherein the filter further comprises a second variable capacitor, wherein a capacitance of the second variable capacitor is configured to adjust the peak-to-peak delay variation for electromagnetic signals with different frequencies in a passband of the filter when varied.

Example 10 includes the radar altimeter system of Example 9, wherein the first variable capacitor and the second variable capacitor are electronically variable capacitors.

Example 11 includes a method comprising: varying a phase of a delayed signal in a local oscillator delay line of a frequency modulated continuous wave radar altimeter by adjusting a variable delay circuit to maintain a quadrature relationship between the phase of the delayed signal and a composite-leakage signal; and combining the delayed signal and the composite-leakage signal using a frequency mixer.

Example 12 includes the method of Example 11, wherein the composite-leakage signal comprises a circulator-leakage signal and an antenna-reflection-leakage signal.

Example 13 includes the method of any of Examples 11-12, wherein the variable delay circuit is a switched-line delay network.

Example 14 includes the method of any of Examples 11-12, wherein the variable delay circuit is a filter.

Example 15 includes the method of Example 14, wherein the filter includes a first variable capacitor and a second variable capacitor; wherein adjusting the variable delay circuit to maintain a quadrature relationship between the phase of the delayed signal and a composite-leakage signal comprises: varying a capacitance of the first variable capacitor to adjust the delay applied to an electromagnetic signal travelling through the filter when varied; and varying a capacitance of the second variable capacitor to adjust the peak-to-peak delay variation for electromagnetic signals with different frequencies in a passband of the filter when varied.

Example 16 includes the method of Example 15, wherein the first variable capacitor and the second variable capacitor are electronically variable capacitors.

Example 17 includes an apparatus comprising: a local oscillator delay line including a variable delay circuit for use in an altimeter, wherein the local oscillator delay line delays a signal travelling through the linear oscillator delay line by an amount to maintain a quadrature relationship with a composite-leakage signal in the altimeter, and wherein the composite-leakage signal is comprised of a circulator-leakage signal and an antenna-reflection-leakage signal.

Example 18 includes the apparatus of Example 17, wherein the variable delay circuit is a switched-line delay network.

Example 19 includes the apparatus of any of Example 17, wherein the variable delay circuit is a filter.

Example 20 includes the apparatus of Example 19, wherein the filter is a second-order bandpass filter comprising a variable shunt capacitor, a shunt inductor, a variable series capacitor and a series inductor.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A radar altimeter system comprising:
a transmitter configured to output a transmitter signal;
a local oscillator delay line coupled to the transmitter and including a variable time delay circuit comprising at least one analog radio frequency component, the local oscillator delay line configured to receive at least a portion of the transmitter signal and to add a time delay to the at least the portion of the transmitter signal using the at least one analog radio frequency component and resulting in a delayed signal, the variable time delay circuit configured to be adjustable so as to adjust the time delay used in creating the delayed signal, wherein the variable time delay circuit includes a filter comprising a variable shunt capacitor coupled to ground, a shunt inductor coupled to ground, a variable series capacitor, and a series inductor coupled to the variable series capacitor;
a transceiver circulator coupled to the transmitter;
an antenna coupled to the transceiver circulator;
a frequency mixer coupled to the local oscillator delay line and coupled to the transceiver circulator;
wherein the transceiver circulator directs the at least the portion of the transmitter signal to the antenna;
wherein the antenna is configured to transmit the at least the portion of the transmitter signal and receive a target reflected signal from a target, wherein the target reflected signal includes at least a portion of the transmitter signal reflected from the target;
wherein the transmitted signal, the delayed signal, and the target reflected signal are analog radio frequency signals; and
wherein the frequency mixer is configured to receive the delayed signal and the target reflected signal from the transceiver circulator.

2. The radar altimeter system of claim 1, wherein a phase of the delayed signal at the frequency mixer is configured such that a quadrature relationship between the phase of the delayed signal and a phase of a composite-leakage signal is maintained.

3. The radar altimeter system of claim 2, wherein the composite-leakage signal comprises a circulator-leakage signal and an antenna-reflection-leakage signal.

4. The radar altimeter system of claim 1, further comprising a receiver baseband module coupled to the frequency mixer.

5. The radar altimeter system of claim 1, wherein the delayed signal is an electromagnetic signal.

6. A method comprising:
outputting a transmitter signal from a transmitter in a radar altimeter system;

delaying at least a portion of the transmitter signal using at least one analog radio frequency component of a variable time delay circuit of a local oscillator delay line of the radar altimeter system resulting in a delayed signal, the local oscillator delay line including a variable time delay circuit adjustable to adjust the time delay added to the delayed signal, wherein the variable time delay circuit includes a filter comprising a variable shunt capacitor coupled to ground, a shunt inductor coupled to ground, a variable series capacitor, and a series inductor coupled to the variable series capacitor;

transmitting at least a portion of the transmitter signal using a transceiver circulator and an antenna;

receiving a target reflected signal from a target at the antenna and passing it through the transceiver circulator to a frequency mixer, the target reflected signal including at least a portion of the transmitter signal reflected from the target;

wherein the transmitted signal, the delayed signal, and the target reflected signal are analog radio frequency signals; and receiving the delayed signal and the target reflected signal at the frequency mixer.

7. The method of claim 6, wherein a phase of the delayed signal at the frequency mixer is configured to maintain a quadrature relationship between the phase of the delayed signal and a phase of a composite-leakage signal;

wherein the composite-leakage signal comprises a circulator-leakage signal and an antenna-reflection-leakage signal.

8. An apparatus comprising:

a local oscillator delay line including a variable time delay circuit for use in an altimeter, wherein the variable time delay circuit includes at least one analog radio frequency component, wherein the variable time delay circuit includes a filter comprising a variable shunt capacitor coupled to ground, a shunt inductor coupled to ground, a variable series capacitor, and a series inductor coupled to the variable series capacitor;

wherein the local oscillator delay line delays a signal travelling through the local oscillator delay line by a quantity of time using the at least one analog radio frequency component to maintain a quadrature relationship with a composite-leakage signal in the altimeter, wherein the local oscillator delay line is configured to be adjustable so as to adjust the quantity of time, and wherein the composite-leakage signal is comprised of a circulator-leakage signal and an antenna-reflection-leakage signal, wherein the composite-leakage signal, the circulator-leakage signal, and the antenna-reflection-leakage signal are analog radio frequency signals.

9. The apparatus of claim 8, wherein the variable shunt capacitor and the variable series capacitor are electronically variable capacitors.

10. The apparatus claim 8, wherein a capacitance of the variable shunt capacitor is configured to adjust the time delay applied to an electromagnetic signal travelling through the filter when varied.

11. The apparatus of claim 8, wherein a capacitance of the variable series capacitor is configured to adjust the variation in the time delay applied to the electromagnetic signals traveling through the filter.

12. The apparatus of claim 8, wherein the local oscillator delay line including the variable time delay circuit is implemented in a radar altimeter system.

\* \* \* \* \*